United States Patent [19]

Ogawa

[11] Patent Number: 5,250,978
[45] Date of Patent: Oct. 5, 1993

[54] FLASHING DEVICE
[75] Inventor: Kimiaki Ogawa, Tokyo, Japan
[73] Assignee: Asahi Kogaku Kogyo Kabushiki Kaisha, Tokyo, Japan
[21] Appl. No.: 832,074
[22] Filed: Feb. 6, 1992
[30] Foreign Application Priority Data
  Feb. 7, 1991 [JP] Japan .................. 3-102198
[51] Int. Cl.⁵ .................. G03B 15/05; H05B 41/32
[52] U.S. Cl. .................. 354/418; 354/127.1; 315/241 P
[58] Field of Search .......... 354/418, 127.1, 127.11, 354/127.12, 145.1; 315/241 R, 241 P; 320/1

[56] References Cited
U.S. PATENT DOCUMENTS

| | | | |
|---|---|---|---|
| 3,569,779 | 3/1971 | Luursema | 315/241 P X |
| 3,822,393 | 7/1974 | Karpol | 315/241 P |
| 4,270,079 | 5/1981 | Ikawa | 320/1 |
| 4,737,806 | 4/1988 | Sakaguchi et al. | 354/145.1 |
| 5,016,038 | 5/1991 | Kobayashi et al. | 354/418 |
| 5,023,470 | 6/1991 | Onozuka et al. | 354/127.1 X |
| 5,034,662 | 7/1991 | Nishida et al. | 354/127.1 X |

Primary Examiner—W. B. Perkey
Attorney, Agent, or Firm—Sandler, Greenblum & Bernstein

[57] ABSTRACT

A flashing device associated with a camera is provided with a light emitting member, a condenser that is charged to supply electricity to the light emitting member, and a charging circuit for charging the condenser. The charging circuit is controlled to intermittently charge the condenser in accordance with the charged voltage of the condenser.

24 Claims, 6 Drawing Sheets

FLASHING DEVICE

BACKGROUND OF THE INVENTION

The present invention relates to a flashing device for cameras, and more particularly, to controlling a charging of condenser for supplying electricity to a light emiitting member.

A flashing device can emit light at a specified voltage (hereinafter referred to as a first voltage), however, it is desirable to apply a voltage (hereinafter referred to as the second voltage), which is higher than the first voltage to the light emitting device, in order to obtain the maximum luminous energy of the flashing device.

Conventionally, charging of a condenser for supplying voltage to the light emitting device is performed through a voltage increasing circuit which is connected with a power source. With this construction, when the recharging of the condenser to the second voltage (hereinafter referred to as a full charge) and light emission of the light emitting device are successively repeated, elements such as transistors or a transformer in the voltage increasing circuit are undesirably heated and the voltage increasing circuit may be burnt or damaged.

Therefore, in order to prevent such problems, a device is provided with a sensor device for detecting the temperature of the voltage increasing circuit, and the recharge of the condenser is prohibitted when the temperature of the voltage increasing circuit is relatively high. Alternatively, a device is suggested in which recharging is prohibited for a predetermined period of time after charging has been finished or flash light has been emitted.

In the former case, however, the sensor device occupies space. Therefor, the entire flashing device becomes large in size.

In the latter case, in order to allow the flash light emission and full charge to be repeatedly performed, a recharge prohibit period should be specified for a sufficiently long period so that the voltage increasing circuit is not undesirablly heated.

If the recharge prohibit period is specified for a long time, however, there may arises a problem that the flash light emission can not be used immediately after the light emission, and promptness of the flashing device become lowered.

SUMMARY OF THE INVENTION

It is therefore an object of the present invention to provide an improved flashing device in which the recharging of a condenser for supplying voltage of a flash light can be executed without excessive heating of a voltage increasing circuit for charging the condenser.

For the above object, according to the present invention, there is provided a flashing device for emitting light, comprising means for emitting light, a condenser for being charged and supplying electricity to the means for emitting light, and means for charging the condenser, the flashing device further comprising:
means for detecting a voltage of the condenser; and
means for controlling the charging means to intermittently charge the condenser in accordance with the voltage detected by the detecting means.

Optionally, the controlling means comprises means for determining whether the voltage of the condenser reaches a predetermined value, and wherein the controlling means controls said means to intermittently charge the condenser when it is determined that the voltage of the condenser has reached the predetermined value.

According to another aspect of the invention, there is provided a method for controlling the charging means provided in a flashing device, the flashing device having a condenser for supplying electricity to an illuminating means, the condenser being charged by the charging means, and a power source for supplying electricity to the charging means, the method comprising the steps of:
charging the condenser;
determining whether the charged voltage of the condenser reaches a predetermined voltage; and
intermittently charging the condenser when the charged voltage of the condenser is higher than or equal to the predetermined voltage.

Optionally, the step of intermittently charging comprises alternate steps of:
charging the condenser for a first predetermined period; and
ceasing charging of the condenser for a second predetermined period.

According to a further aspect of the invention, there is provided a camera comprising means for emitting light, a condenser for being charged and supplying electricity to the means for emitting light, and means for charging the condenser, the camera further comprising:
means for detecting a voltage of said condenser; and
means for controlling the charging means to intermittently charge the condenser in accordance with the voltage detected by the detecting means.

Optionally, the controlling means comprises means for determining whether the voltage of the condenser reaches a predetermined value, and wherein the controlling means controls the means for charging to intermittently charge the condenser when it is determined that the voltage of the condenser has reached the predetermined value.

Further, the controlling means controls the charging means in such a fashion that charging and ceasing of charging are alternately executed when the voltage of the condenser is higher than or equal to the predetermined value.

Furthermore, the charging and the ceasing of the charging are periodically executed, the charging being executed for a first predetermined period, the charging being ceased for a second predetermined period.

DESCRIPTION OF THE ACCOMPANYING DRAWINGS

DESCRIPTION OF THE EMBODIMENTS

Figure 1:
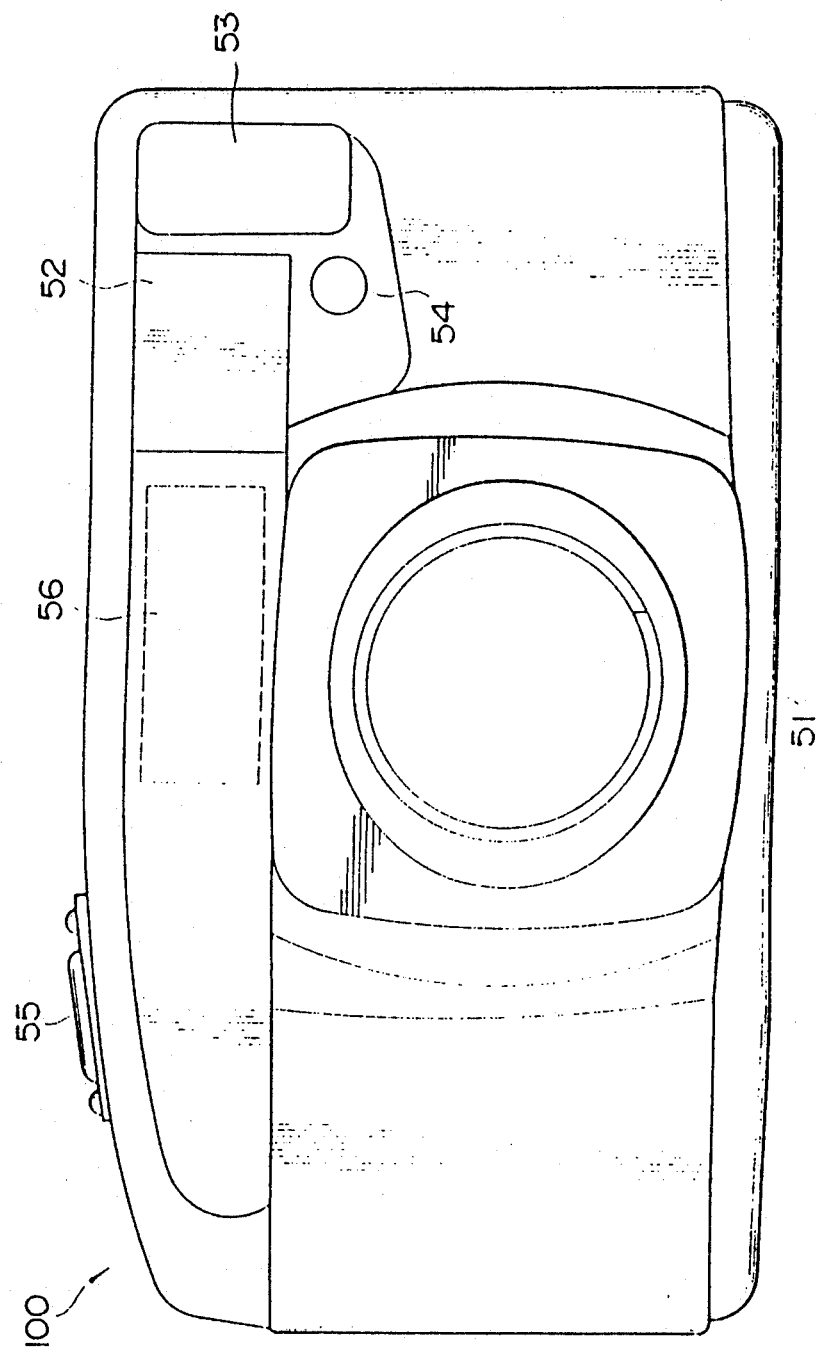
FIG. 1 is a front view of a camera having a flashing device embodying the present invention.

FIG. 1 shows a front view of a camera 100 that is provided with a flashing device embodying the present invention. The camera 100 is a compact type lens shutter camera which comprises a lens 51, a finder 52, a light emitting member 53 of the flashing device, a CdS sensor 54 for photometry sensing, and a distance measurement device 55.

Figure 2:
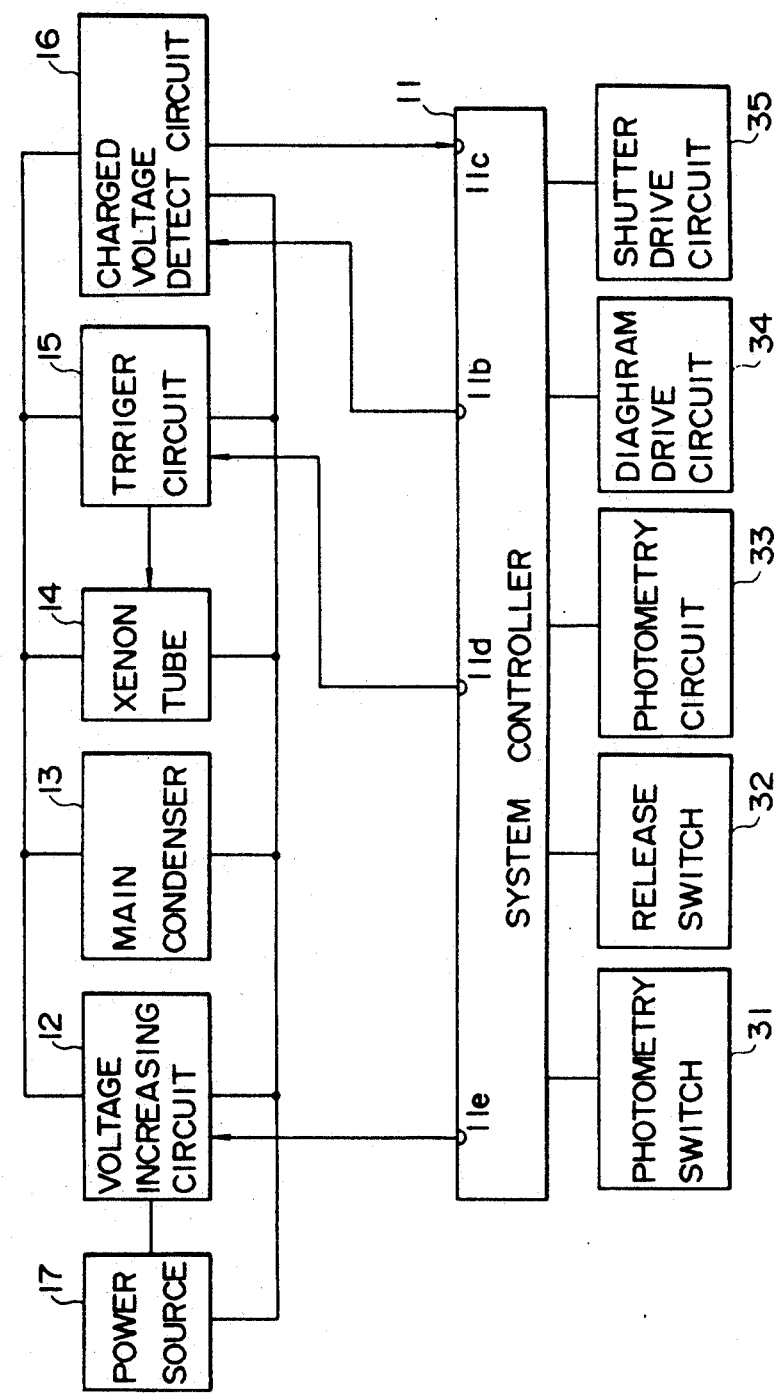
FIG. 2 is a block diagram of the camera of FIG. 1.

FIG. 2 shows a block diagram of the camera 100 of FIG. 1. A system controller 11 comprises a microcomputer for controlling a flashing device as well as various controls of the camera 100.

The flashing device comprises a voltage increasing circuit 12, a main condenser 13, a xenon tube 14, a trigger circuit 15, and a charged voltage detecting circuit 16 which are connected in parallel. With this construction, an accumulated voltage of the main condenser 13 (for example, 300 V) is applied to the xenon tube 14. The xenon tube 14 commences its discharge upon receiving a trigger voltage (for example, 4 kV) applied by the trigger circuit 15, and emits light at a luminous energy corresponding to the charged voltage of the main condenser 13. The trigger circuit 15 outputs the trigger voltage according to a trigger instruction signal inputted from port 11d of the system controller 11. The voltage increasing circuit 12 receives the voltage from a power source 17 and raises it, applies the raised voltage to the main condenser 13 for charging it. The charging starts when a switching element, such as a transistor is set to an ON state in response to a the charge instruction signal which is inputted from port 11e of the system controller 11.

The voltage detecting circuit 16 detects the charged voltage of the main condenser 13, and outputs a charged level signal in accordance with the magnitude of the charged voltage of the main condenser 13 to a port 11c of the system controller 11. Namely, the charged voltage detecting circuit 16 outputs a low (L) signal of, for example, about 0 V when the charged voltage of the main condenser 13 is more than or equal to a predetermined voltage value, and outputs a high (H) signal of, for example, about 5 V when the voltage of the main condenser 13 is lower than the predetermined voltage value. In this embodiment, the charged voltage detecting circuit 16 is capable of detecting first and second voltage values (i.e., 270 V and 330 V) of the charged voltage of the main condenser 13. One of the first and second voltage values to be detected are selectively set by a value change signal inputted from the system controller 11.

Figure 3:
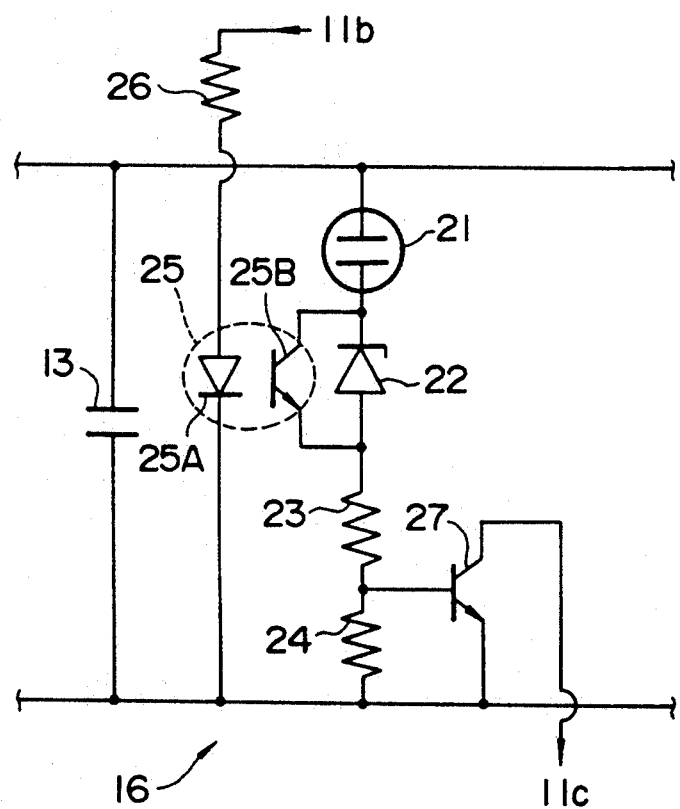
FIG. 3 shows a voltage detecting circuit for detecting a charged condition of a condenser used with the flashing device.

FIG. 3 shows an example of the charged voltage detecting circuit 16.

In the figure, a neon tube 21, a Zener diode 22, resistors 23 and 24 that are connected in series, and the charged voltage detecting circuit 16 is connected with the main condenser 13. A phototransistor 25B, which constitutes a photosensor unit of a photocoupler 25, is connected in parallel with the zener diode 22. The light-emitting diode 25A, which constitutes a light-emitting unit of a photocoupler 25, is connected to port 11b of the system controller 11 through the resistor 26. A base of the transistor 27 is connected at the point where the resistors 23 and 24 are connected, and a collector of the transistor 27 is connected to port 11c of the system controller 11.

In the present embodiment, it is so designed that the neon tube 21 is turned ON at 270 V and the Zener diode is turned ON at 60 V.

When a high signal of, for example, 5 V is transmitted from the port 11b of the system controller 11 to the charged voltage detecting circuit 16 as a detect voltage select signal, the light-emitting diode 25A is illuminated and the phototransistor 25B is turned ON. Thus, the neon tube 21 is connected to the transistor 27 by way of the phototransistor 25B. Accordingly, when the voltage of the main condenser 13 reaches 270 V or over, the neon tube 21 is turned ON, whereby the transistor 27 is turned ON, and the voltage detecting circuit 16 outputs a low signal to the port 11c of the system controller 11.

When a low signal, for example, of about 0 V is inputted from the port 11b of the system controller 11, the photocoupler 25 is turned OFF. Therefore, the neon tube 21 is connected through the Zener diode 22 to the transistor 27. Accordingly, when the voltage of the main condenser 13 reaches 330 V or over, the neon tube 21 and the Zener diode 22 are turned ON, thereby causing the transistor 27 to be turned ON, and the voltage detecting circuit 16 outputs a low signal to the port 11c of the system controller 11.

In FIG. 2, a photometric switch 31, a release switch 32, a photometric circuit 33, a diaphragm drive circuit 34 and a shutter drive circuit 35, which have been conventionally employed in cameras, are connected to the system controller 11, respectively.

The photometric switch 31 is turned ON when release button 55 provided on camera body 100 is depressed half way. The release switch 32 is turned ON when the release button 55 is fully depressed. The photometric circuit 33 is activated when the photometric switch 31 is turned ON, and it obtains a luminance of the object. The system controller 11 executes a calculation of the adequate shutter speed, the aperture value, etc., in accordance with the obtained luminance of the object, film sensitivity and other information. In accordance with the result of the calculation of the system controller 11, the diaphragm will be driven by the diaphragm drive circuit 34. Thereafter, when the release switch 32 is turned ON, the shutter mechanism is driven in accordance with the calculated shutter speed, and the photographic shooting is carried out. The above-described shooting process is the process wherein the flashing device is not used.

When the flashing device is used in shooting, the aperture value and the shutter speed are set to predetermined values, respectively.

Figure 4:
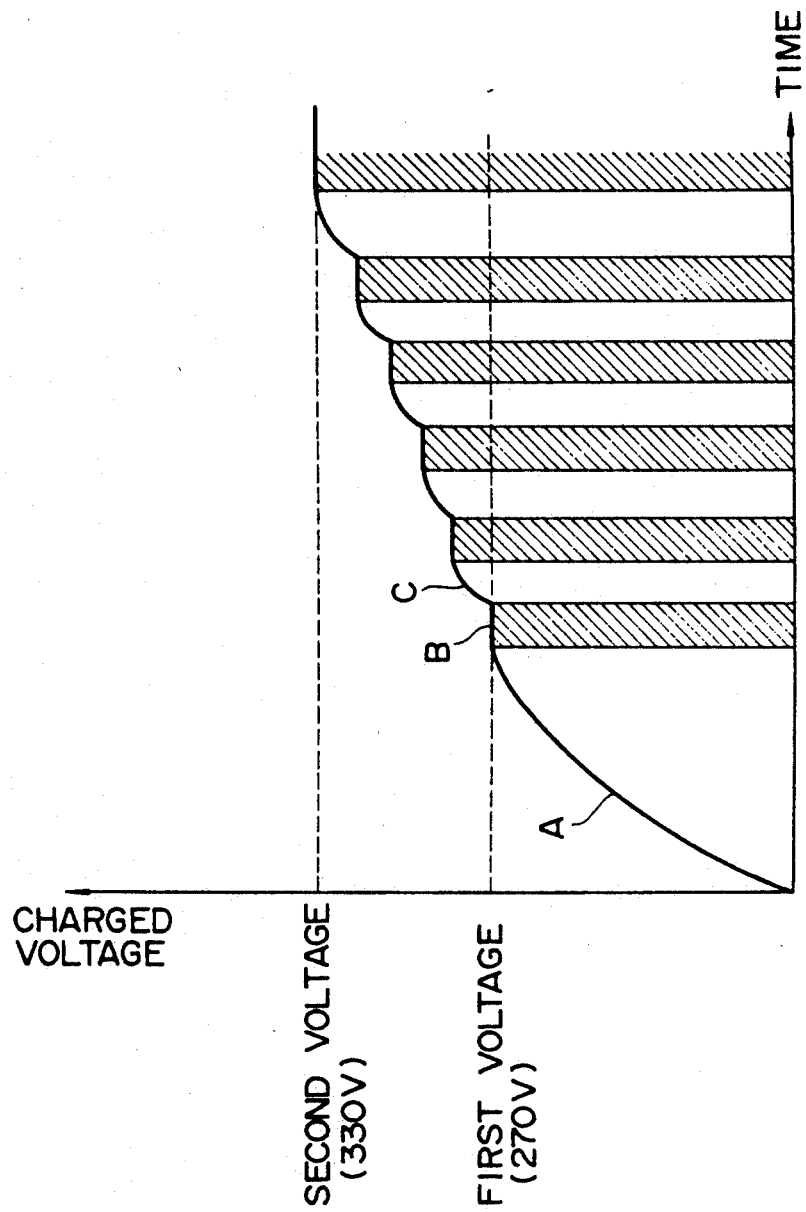
FIG. 4 is a graph showing chronological changes of the charged voltage of the condenser.

FIG. 4 shows chronological changes of the charged voltage of the main condenser 13 according to the present embodiment, which shows the case where the charging starts when the voltage of the main condenser 13 is 0 V.

At the beginning of the charging, a high signal is applied to the charged voltage detecting circuit 16 from port 11b of the system controller 11 as the detect voltage select signal. Thus, the voltage detecting circuit 16 is set such that it detects whether the voltage of the main condenser 13 has reached the first voltage (270 V).

As the voltage of the main condenser 13 is increased smoothly by the voltage applied by the voltage increasing circuit 12, as indicated by a symbol A, and when the charged voltage reaches the first voltage, the low signal is transmitted to the charged voltage detecting circuit 16 from port 11b of the system controller 16, as the detect voltage select signal.

Upon receipt of the low signal as the detect voltage select signal, the charged voltage detecting circuit 16 changes the voltage to be detected to the second voltage (330 V).

While the second voltage is set as the voltage to be detected by the charged voltage detecting circuit 16, the voltage increasing circuit 12 intermittently charges the main condenser 13 in accordance with the charge instruction signal transmitted from the port 11e of the system controller 11.

When the voltage of the main condenser 13 reaches the first voltage, and the the second voltage is set as the voltage to be detected by the charged voltage detecting circuit 16, the voltage increasing circuit 12 is controlled to cease charging, as indicated by symbol B in FIG. 4. After a predetermined period has elapsed, charging is restarted as indicated by symbol C. Thereafter, as shown in FIG. 4, the intermittent charging is continued. Controlled as above, the curve of the graph after the voltage of the main condenser 13 has reached the first voltage becomes gentle with respect to the curve when the voltage of the main condenser 13 is lower than the first voltage. When the voltage of the main condenser 13 reaches the second voltage, the system controller 11 controls the voltage increasing circuit 12 to stop charging the main condenser 13.

In this embodiment, the intermittent charging is designed in such a fashion that the period in which charging is ceased is 750 ms (milisecond), and the period of charging is 250 ms. The periods above can be sepecified if necessary. Further, although the intermittent charging is designed to be periodic, it is not limited to such a controll, but can be defined to change any one of the ceasing and charging periods. For example, the charging can be controlled such that the higher the voltage of the main condenser 13 is, the longer the period of ceasing the charge of the condenser 13.

Figure 5:
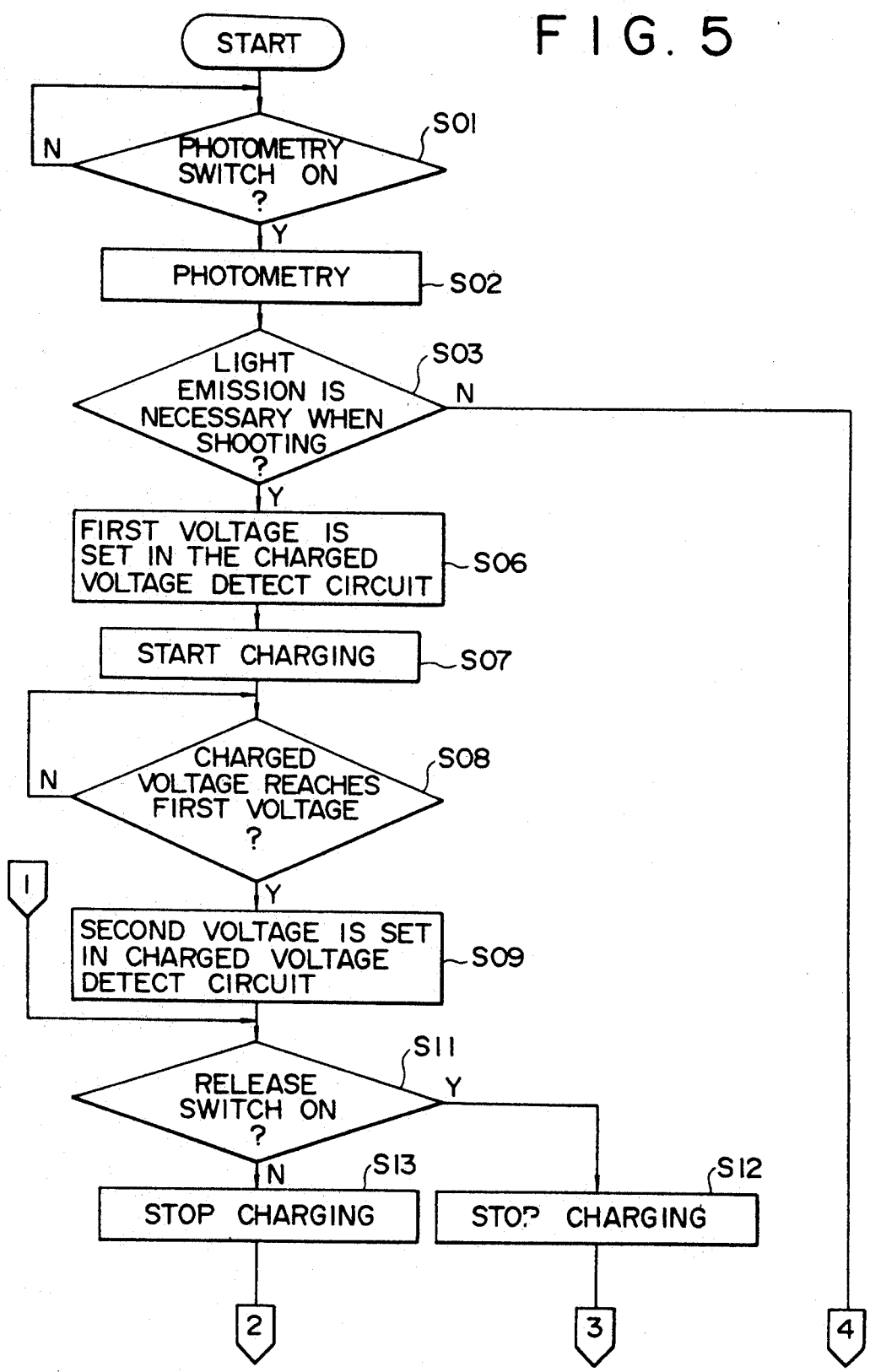
FIGS. 5 and 6 show a flow chart illustrating a control of the photographing of a camera according to the present invention.
Figure 6:
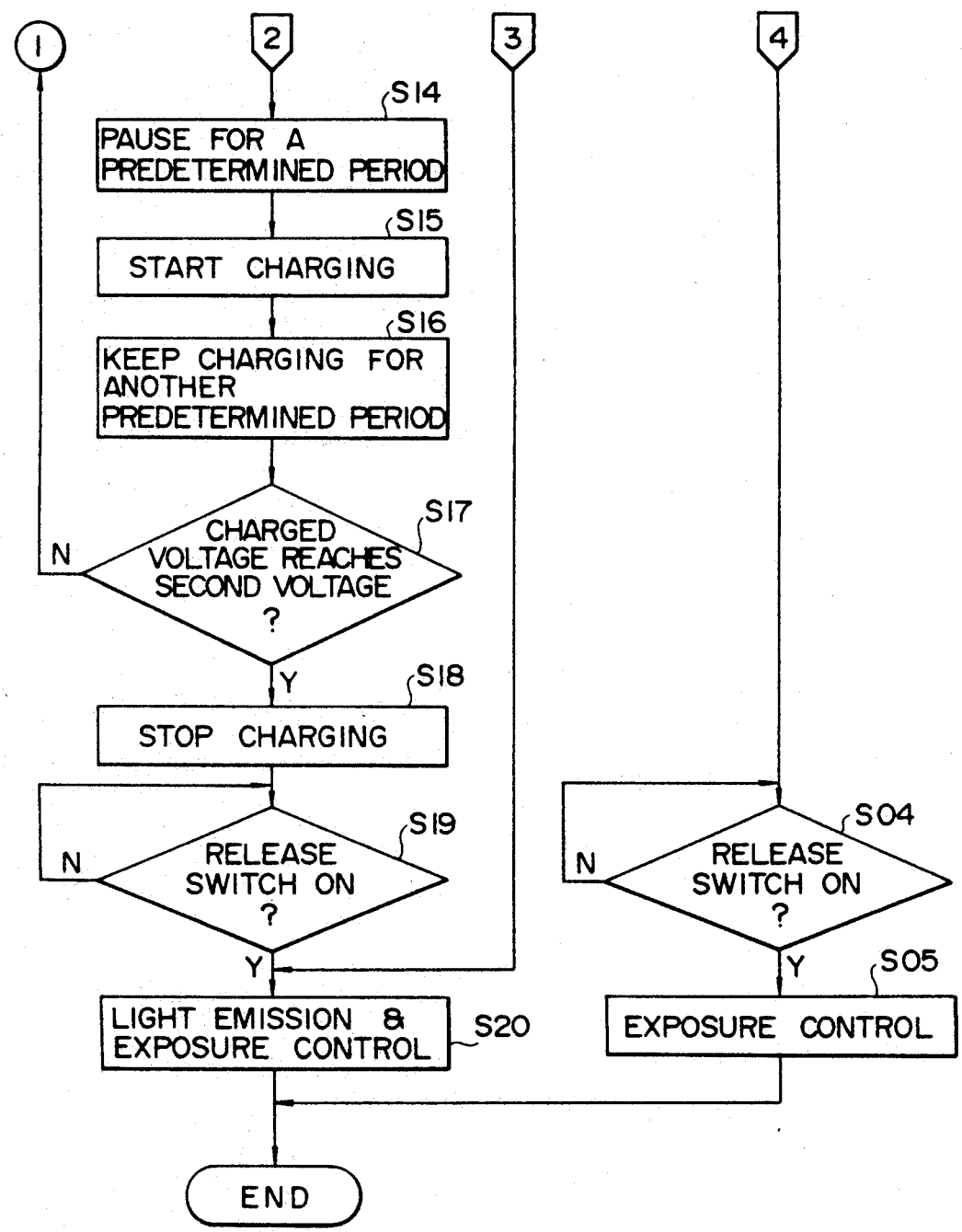

FIG. 5 and FIG. 6 are flow charts illustrating the control of the photographic action in which the embodiment of the present invention is employed.

The photometric switch 31 is turned ON when the release button 55 is depressed halfway. When the photometric switch 31 is turned ON, a photometric operation is carried out by the photometric circuit 33, and the luminance of an object is obtained (in steps S01 and S02). In accordance with the obtained luminance, it is determined whether the flash light is necessary in step S03. If it is determined that no flash light is used, it is detected whether the release button 55 is fully depressed and the release switch 32 is turned ON in step S04. If the release button 55 is fully depressed, a normal exposure control is performed, and photographic shooting is executed in accordance with the calculated aperture value and shutter speed in step S05. Thus, control of photographing is completed.

If it is determined that the flash light is necessary in step S03, the first voltage (270 V) is set as a voltage to be detected by the charge voltage detecting circuit 16 in step S06. Then, charging of the main condenser 13 is started at step S07.

Thus, the voltage of main condenser 13 is increased smoothly as indicated by symbol A of FIG. 4. When the voltage of the main condenser 13 reaches the first voltage, the second voltage (330 V) is set as a voltage to be detected by the voltage detecting circuit 16 (in steps S08 and S09).

At this stage, if the release switch 32 is in the ON state, i.e., if the release button 55 is fully depressed, the charging of the main condenser 13 is stopped at step S12. Subsequently, the exposure control is performed with the xenon tube 14 being driven to emit light, thereby causing a photographic shooting to be executed at step S20. In the above described case, the voltage of the main condenser 13 is between the first voltage and the second voltage, and the xenon tube 14 emits light in correspondence with the voltage of the main condenser 13.

If the release switch 32 is not in the ON state and the voltage of the main condenser 13 has not reached the second voltage, the intermittent charging is executed in steps S13 through S17. When the voltage of the main condenser 13 reaches the second voltage, the charging is stopped at step S18. Thereafter, if the release switch 32 is turned ON, the photographic shooting with the flash light emitting is performed at step S20.

According to the present invention, there is no need to provide a circuit for detecting the temperature of the voltage increasing circuit in order to prevent the heat generation thereof. Accordingly, the flashing device can be made compact in size.

Further, in the above-described embodiment, the voltage increasing circuit is controlled to continuously charge the main condenser when the voltage of the main condenser is lower than the first voltage, and to intermittently charge it when the voltage of the main condenser is higher than the first voltage. Accordingly, when the voltage of the main condenser is higher than the first voltage, i.e., when the voltage increasing circuit tends to be heated, the charging operation of the voltage increasing circuit is repressed, thereby the generation of heat of the voltage increasing circuit being prevented and the damage thereof can be avoided.

Furthermore, according to the present invention, since the undisirable heat generation of the voltage increasing circuit is prevented as described above, the charging of the main condenser can be executed immediately after the flash light is emitted. In other words, there is no need to prohibit charging of the main condenser after the flash light is emitted; the main condenser can be recharged in a relatively short period of time with respect to conventional flashing devices, which result in the improvement of the promptness of the flashing device.

The present disclosure relates to a subject matter contained in Japanese Patent Application No. HEI 3-102198 (filed on Feb. 7, 1991) which is expressly incorporated herein by reference in its entirety.

What is claimed is:

1. A flashing device for emitting light, comprising means for emitting light, a condenser that is charged to supply electricity to said light emitting means, and means for charging said condenser, said flashing device further comprising:
   means for detecting a voltage of said condenser;
   means for controlling said charging means to intermittently charge said condenser in accordance with said voltage detected by said detecting means after said detected voltage reaches a predetermined value; and
   means for terminating said intermittent charging of said condenser if said detected voltage reaches a second predetermined value.

2. The flashing device of claim 1, wherein said controlling means comprises means for determining whether said voltage of said condenser reaches said predetermined value, and wherein said controlling means controls said charging means to intermittently charge said condenser when it is determined that said voltage of said condenser has reached said predetermined value.

3. The flashing device of claim 2, wherein said controlling means controls said charging means in such a fashion that said charging of said condenser and a ceasing of charging of said condenser are alternately executed when said voltage of said condenser is higher than that or equal to said predetermined value.

4. The flashing device of claim 3, wherein said charging and said ceasing of said charging are periodically executed, said charging being executed for a first predetermined period, and said charging being ceased for a second predetermined period.

5. A flashing device for emitting light, comprising means for emitting light, a condenser that is charged to supply electricity to said light emitting means, and means for charging said condenser, said flashing device further comprising:
   means for detecting a voltage of said condenser; and
   means for controlling said charging means to intermittently charge said condenser in accordance with said voltage detected by said detecting means after said detected voltage reaches a predetermined value, wherein said controlling means comprises means for determining whether said voltage of said condenser reaches said predetermined value, said controlling means controlling said charging means to intermittently charge said condenser when it is determined that said voltage of said condenser has reached said predetermined value, said determining means determining whether said voltage of said condenser reaches a second predetermined value, and wherein said controlling means stops charging said condenser when said voltage of said condenser reaches said second predetermined value.

6. A flashing device, which is associated with a camera, for emitting light, comprising means for emitting light, a condenser that is charged to supply electricity to said light emitting means, and means for charging said condenser, said flashing device further comprising:
   means for detecting a voltage of said condenser;
   means for controlling said charging means to intermittently charge said condenser in accordance with said voltage of said condenser detected by said detecting means after said detected voltage reaches a predetermined value; and
   means for terminating said intermittent charging of said condenser if said voltage reaches a second predetermined value.

7. The flashing device of claim 6, wherein said controlling means comprises means for determining whether said voltage of said condenser reaches said predetermined value, and wherein said controlling means controls said charging means to intermittently charge said condenser when it is determined that said voltage of said condenser has reached said predetermined value.

8. A flashing device associated with a camera for emitting light, comprising means for emitting light, a condenser that is charged to supply electricity to said light emitting means, and means for charging said condenser, said flashing device further comprising:
   means for detecting a voltage of said condenser;
   means for controlling said charging means to intermittently charge said condenser in accordance with said voltage of said condenser detected by said detecting means after said detected voltage reaches a predetermined value, wherein said controlling means comprises means for determining whether said voltage of said condenser reaches said predetermined value, said controlling means controlling said charging means to intermittently charge said condenser when it is determined that said voltage of said condenser has reached said predetermined value, said determining means determining whether said voltage of said condenser reaches a second predetermined value, said controlling means stopping said charging of said condenser when said voltage of said condenser reaches said second predetermined value.

9. The flashing device of claim 8, wherein said condenser is charged in such a fashion that said charging and a ceasing of charging are alternately executed when said voltage of said condenser is higher than or equal to said predetermined value.

10. The flashing device according to claim 9, wherein said charging and said ceasing of said charging are periodically executed, said charging being executed for a first predetermined period, and said charging being ceased for a second predetermined period.

11. A flashing device associated with a camera for emitting light, comprising means for emitting light, a condenser that is charged to supply electricity to said light emitting means, and means for charging said condenser, said flashing device further comprising:
   means for detecting a voltage of said condenser;
   means for controlling said charging means to intermittently charge said condenser in accordance with said voltage of said condenser detected by said detecting means after said detected voltage reaches a predetermined value, wherein said controlling means comprises means for determining whether said voltage of said condenser reaches said predetermined value, said controlling means controlling said charging means to intermittently charge said condenser when it is determined that said voltage of said condenser has reached said predetermined value, said determining means determining whether said voltage of said condenser reaches a second predetermined value, said controlling means stopping said charging of said condenser when a photograph shooting is executed.

12. The flashing device of claim 6, wherein said controlling means controls said charging means to stop charging when a photograph shooting is executed.

13. A method for controlling a charger provided in a flashing device, the flashing device having a condenser that supplies electricity to an illuminator, the condenser being charged by the charger, and a power source for supplying electricity to the charger, the method comprising the steps of:
   charging the condenser;
   determining whether the charged voltage of the condenser reaches a predetermined voltage;
   intermittently charging the condenser when the charged voltage of the condenser is higher than or equal to the predetermined voltage; and
   terminating the intermittent charging of the condenser if the charged voltage of the condenser reaches a second predetermined value.

14. The method of claim 13, wherein the step of intermittently charging comprises alternate steps of:
   charging the condenser for a first predetermined period; and
   ceasing charging of the condenser for a second predetermined period.

15. A camera comprising means for emitting light, a condenser that is charged to supply electricity to said light emitting means, and means for charging said condenser, said camera further comprising:
   means for detecting a voltage of said condenser;

means for controlling said charging means to intermittently charge said condenser in accordance with said voltage detected by said detecting means after said detected voltage reaches a predetermined value; and means for terminating said intermittent charging of said condenser if said detected voltage reaches a second predetermined value.

16. The camera device of claim 15, wherein said controlling means comprises means for determining whether said voltage of said condenser reaches said predetermined value, and wherein said controlling means controls said charging means to intermittently charge said condenser when it is determined that said voltage of said condenser has reached said predetermined value.

17. The camera of claim 16, wherein said controlling means controls said charging means in such a fashion that said charging and a ceasing of charging are alternately executed when said voltage of said condenser is higher than or equal to said predetermined value.

18. The camera of claim 17, wherein said charging and said ceasing of said charging means are periodically executed, said charging being executed for a first predetermined period, said charging being ceased for a second predetermined period.

19. An apparatus for controlling a charging of a flash device, comprising:

means for continuously charging a condenser that supplies electricity to a light emitter that is activatable to emit light;

means for detecting when a voltage of said condenser reaches a predetermined value;

means for intermittently charging said condenser when said detected voltage reaches said predetermined value; and means for terminating said intermittent charging of said condenser if said detected voltage reaches a second predetermined value.

20. An apparatus for controlling a charging of a flash device, comprising:

means for continuously charging a condenser that supplies electricity to a light emitter that is activatable to emit light;

means for detecting when a voltage of said condenser reaches a predetermined value;

means for intermittently charging said condenser when said detected voltage reaches said predetermined value;

means for detecting whether said voltage of said condenser reaches a second predetermined value; and means for terminating a charging of said condenser if said detected voltage reaches said second predetermined value.

21. The apparatus of claim 19, wherein when said condenser is intermittently charged, said charging of said condenser is executed for a first predetermined period, and a ceasing of said charging of said condenser occurs for a second predetermined period.

22. An apparatus for controlling a charging of a flash device, comprising:

means for charging a condenser associated with said flash device on a continuous basis until a first predetermined value;

means for intermittently charging said condenser when said voltage reaches said predetermined value; and means for terminating a charging of said intermittently charged condenser if said voltage reaches a second predetermined value.

23. A method for controlling a charging of a flash device, comprising the steps of:

charging a condenser associated with the flash device on a continuous basis;

determining whether a voltage of the charging condenser reaches a predetermined voltage;

charging the condenser on an intermittent basis when the charging voltage of the condenser is detected to reach the predetermined voltage; and terminating the intermittent charging of the condenser if the detected voltage reaches a second predetermined value.

24. A method for controlling a charging of a flash device, comprising the steps of:

charging a condenser associated with the flash device on a continuous basis;

determining whether a voltage of the charging condenser reaches a predetermined voltage;

charging the condenser on an intermittent basis when the charging voltage of the condenser is detected to reach the predetermined voltage;

determining whether the intermittently charging condenser reaches a second predetermined voltage; and terminating the intermittent charging of the condenser if the charging voltage of the condenser is detected to reach the second predetermined value.

* * * * *